US008503364B2

(12) United States Patent
Zhang et al.

(10) Patent No.: US 8,503,364 B2
(45) Date of Patent: Aug. 6, 2013

(54) BROADCAST SIGNALING L1 OVERLOAD INDICATION

(75) Inventors: Xiaoxia Zhang, San Diego, CA (US); Durga Prasad Malladi, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 12/834,185

(22) Filed: Jul. 12, 2010

(65) Prior Publication Data

US 2011/0013560 A1 Jan. 20, 2011

Related U.S. Application Data

(60) Provisional application No. 61/225,484, filed on Jul. 14, 2009.

(51) Int. Cl.
*H04W 4/00* (2009.01)
*H04B 15/00* (2006.01)
*H04B 7/00* (2006.01)
*H04W 84/04* (2009.01)
*H04B 1/10* (2006.01)
*H04W 52/24* (2009.01)

(52) U.S. Cl.
CPC ............ *H04W 84/04* (2013.01); *H04B 1/1027* (2013.01); *H04W 52/24* (2013.01)
USPC ............................ 370/328; 455/501; 455/522

(58) Field of Classification Search
USPC ................... 370/328; 455/39, 501, 507, 517, 455/522
See application file for complete search history.

(56) References Cited

U.S. PATENT DOCUMENTS

| 2008/0081655 | A1* | 4/2008 | Shin et al. ............... 455/522 |
| 2009/0111503 | A1* | 4/2009 | Pedersen et al. ......... 455/522 |
| 2009/0197630 | A1* | 8/2009 | Ahn et al. ............... 455/522 |
| 2009/0238091 | A1* | 9/2009 | Kim et al. ............... 370/252 |
| 2010/0254292 | A1* | 10/2010 | Kim et al. ............... 370/311 |
| 2010/0291962 | A1* | 11/2010 | Kim et al. ............... 455/522 |
| 2011/0039589 | A1* | 2/2011 | Skov ....................... 455/501 |

FOREIGN PATENT DOCUMENTS

WO WO 2008055132 A2 5/2008

OTHER PUBLICATIONS

International Search Report and Written Opinion—PCT/US2010/042008, International Search Authority—European Patent Office—Nov. 4, 2010.
Lucent Technologies: "Uplink Scheduling With Inter—Cell Power Control, with Extensions t o Interference Coordination" 3GPP Draft; R1-063478, 3rd Generation Partnership Project (3GPP), Mobile Competence Centre ; 650, Route Des Lucioles ; F-06921 Sophia-Antipolis Cedex ; France, vol . Ran WG1, no. Riga, Latvia; 20061102, Nov. 2, 2006, XP050103914.

* cited by examiner

*Primary Examiner* — Paul H Masur
(74) *Attorney, Agent, or Firm* — Kenneth Vu

(57) ABSTRACT

Devices and methods are provided for implementing an over-the-air (OTA) broadcast of an overload indication to reduce interference levels at neighboring node(s). In one embodiment, the method involves receiving the OTA broadcast of the overload indication from a neighboring node. The method further involves performing transmit power control based upon the received overload indication to reduce Interference over Thermal (IoT) noise at the neighboring node (e.g., by adjusting the transmit power spectral density). Such a method may be performed, for example, by an access terminal or a small base node.

51 Claims, 16 Drawing Sheets

US 8,503,364 B2

BROADCAST SIGNALING L1 OVERLOAD INDICATION

CLAIM OF PRIORITY UNDER 35 U.S.C. §119

The present Application for Patent claims priority to Provisional Application No. 61/225,484, entitled "BROADCAST SIGNALING L1 OVERLOAD INDICATION," filed Jul. 14, 2009, and is assigned to the assignee hereof, and is hereby expressly incorporated in its entirety by reference herein.

BACKGROUND

1. Field

The present disclosure relates generally to communication, and more specifically to techniques for Interference over Thermal (IoT) noise control in a heterogeneous wireless communication network lacking node backhaul communication.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). LTE, in some instances referred to as Release-8 (of 3GPP), provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an evolved NodeB (eNB) and mobile access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

Overload indication is one aspect LTE, wherein an eNB measures uplink Interference over Thermal (IoT) noise. If the IoT noise is above a certain threshold, then an event is triggered where an overload indication message is sent to the eNBs of neighboring cells via a wired backhaul network (e.g., an X2 interface or the like). However, instances may occur when a given node or terminal is not capable of receiving such overload indication messages from neighboring nodes via the wired backhaul network (e.g., when the backhaul network is down). Accordingly, it would be desirable to deliver the overload indication messages in a manner that is independent of the backhaul network status, and thereby facilitate the reduction of an interference level (e.g., IoT noise) at a neighboring node.

SUMMARY

In accordance with one or more aspects and corresponding disclosure thereof, various aspects are described in connection with broadcasts of an overload indication for Interference over Thermal (IoT) noise control as part of transmit power control for a network in which at least one node or terminal is not capable of receiving an overload indication message from a neighboring node via wired backhaul communication.

In one aspect, a method is provided for performing uplink transmit power control for reducing interference. The method may involve: receiving an over-the-air broadcast of an overload indication from a neighboring node; and performing transmit power control based upon the received overload indication to reduce an interference level (e.g., IoT noise) at the neighboring node. For example, performing the transmit power control may involve adjusting the transmit power spectral density.

In a related aspect, the method may involve detecting the overload indication received on a physical broadcast channel (PBCH) from the neighboring node. The method may involve receiving a defined number (e.g., two) of resource blocks within a center of a given number (e.g., six) of resource blocks in a midamble of a shortened PBCH. The method may involve detecting the overload indication as a bit carried by the PBCH.

In a further related aspect, the method may involve detecting the overload indication received on a physical hybrid automatic repeat request indicator channel (PHICH). The PHICH may be time division multiplexed (TDM) modulated in a different time slot from a plurality of neighboring nodes, or frequency division multiplexed (FDM) modulated in a different frequency resource from a plurality of neighboring nodes, or code division multiplexed (CDM) modulated in a different Walsh code from a plurality of neighboring nodes. The method may involve reserving PHICH resources per cell to convey the overload indication.

In yet a further related aspect, the method may involve receiving the overload indication at an access terminal (AT). In the alternative, or in addition, the method may involve receiving the overload indication at a small base node (e.g., a selected one of a femto access point, a home base node, a closed subscription cell, etc.), and instructing an AT in a coverage area of the small base node to adjust transmit power spectral density based upon the received overload indication to reduce an interference level at the neighboring node.

In another aspect, a method is provided for broadcasting overload indication for interference control. The method may involve: determining that an interference level (e.g., IoT noise) on an uplink exceeds a threshold; and transmitting an over-the-air broadcast of the overload indication for a neighboring recipient to perform transmit power control based upon the overload indication.

In a related aspect, the method may involve transmitting the overload indication on a PBCH. For example, the method may involve transmitting two resource blocks within a center of six resource blocks in a midamble of a shortened PBCH, and/or transmitting the overload indication as a bit carried by the PBCH, thereby using reserved bits in the PBCH.

In a further related aspect, the method may involve transmitting the overload indication on a PHICH, and using the PHICH for a given AT to obtain the load information from neighboring cells. The PHICH may be TDM modulated in a different time slot from a plurality of neighboring nodes, or FDM modulated in a different frequency resource from a plurality of neighboring nodes, or CDM modulated in a different Walsh code from a plurality of neighboring nodes. The method may involve transmitting PHICH resources on the PHICH that are orthogonal across a plurality of neighboring nodes for achieving a defined signal-to-noise ratio penetration.

In accordance with one or more aspects and corresponding disclosure thereof, various aspects are described in connection devices and apparatuses for performing uplink power control or broadcasting an overload indication. The apparatus (e.g., an AT or a small base node) may comprise: an electrical component for receiving an over-the-air broadcast of an overload indication from a neighboring node; and an electrical component for performing transmit power control based upon the received overload indication to reduce an interference level at the neighboring node.

In another aspect, there is provided an apparatus (e.g., a macro base station or a small base node) that comprises: an electrical component for determining that an interference level on an uplink exceeds a threshold; and an electrical component for transmitting an over-the-air broadcast of the overload indication for a neighboring recipient to perform transmit power control based upon the overload indication.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
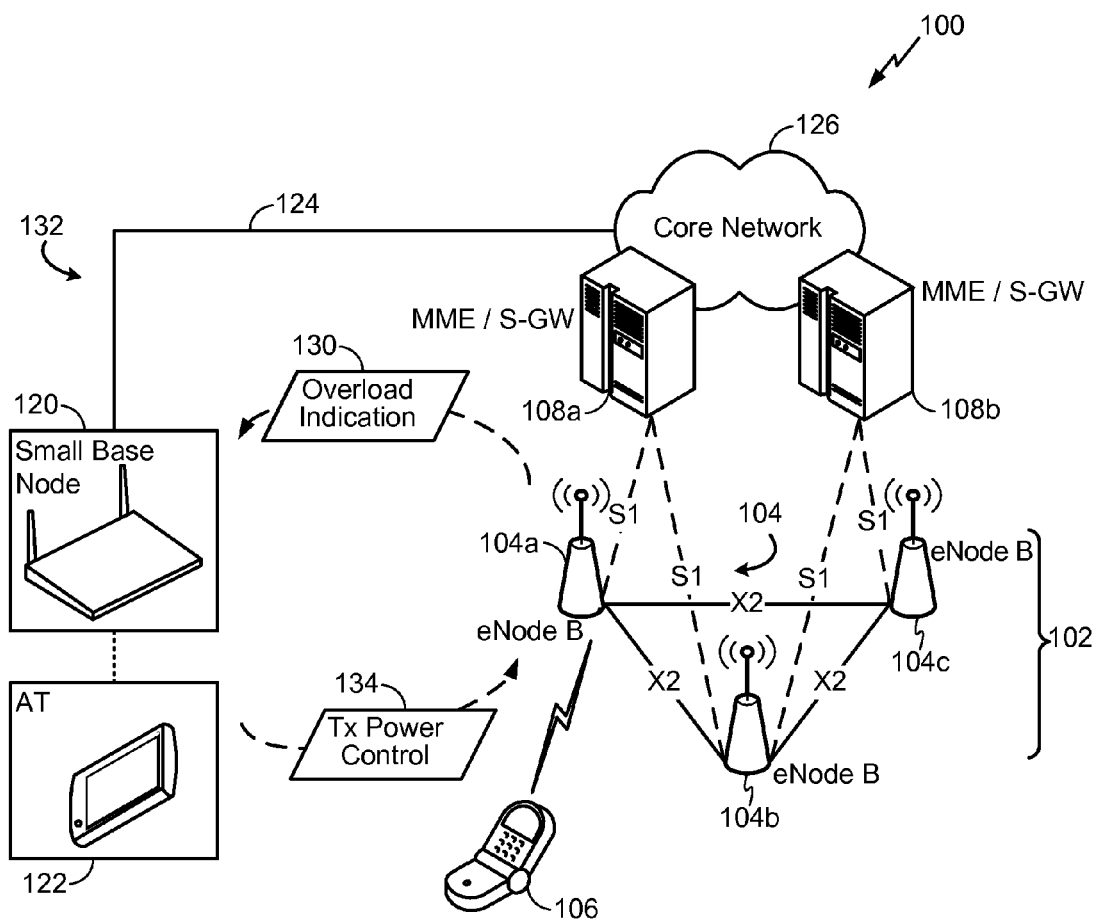
FIG. 1 depicts a block diagram of a heterogeneous communication system for tight interference over thermal noise control based upon broadcast overload indication.

In FIG. 1, a communication system 100 comprises in part an evolved UMTS Terrestrial Radio Access Network (E-UTRAN, also referred to as UTRAN-LTE or as E-UTRA) 102 currently under development within the 3GPP. E-UTRAN system 102 includes evolved NodeBs (eNBs) 104a-104c, providing the E-UTRA user plane and control plane protocol terminations towards user equipment (UE) or access terminal (AT) 106. For example, the user plane can include the Packet Data Convergence Protocol (PDCP), Radio Link Control (RLC), Medium Access Control (MAC), and Physical (PHY) layers, whereas the control plane can include the Radio Resource Control (RRC) layer. The eNBs 104a-104c are interconnected with each other by means of an X2 interface. The eNBs 104a-104c are also connected by means of an S1 interface to an EPC (Evolved Packet Core), more specifically to a Mobility Management Entity (MME) by means of a S1-MME interface and to a Serving Gateway (S-GW) by means of a S1 interface, collectively depicted at 108a-108b. The S1 interface supports a many to many relation between MMEs/S-GWs 108a-108b and eNBs 104a-104c.

The eNBs 104a-104c host the following functions: (a) functions for Radio Resource Management, such as, for example, Radio Bearer Control, radio admission control, connection mobility control, dynamic allocation of resources to ATs in both uplink and downlink (scheduling); (b) IP header compression and encryption of user data stream; (c) selection of a MME at AT attachment; (d) routing of user plane data towards serving gateway; (e) scheduling and transmission of paging messages (originated from the MME); (f) scheduling and transmission of broadcast information; and (g) measurement and measurement reporting configuration for mobility and scheduling.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an AT moves through such a network, the AT may be served in certain locations by access nodes ("ANs") that provide macro coverage while the AT may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNB, macro cell, and so on. Also, a femto node may be configured or referred to as a Home NodeB, Home eNB, access point base station, femto cell, and so on.

Returning to FIG. 1, a small base node (e.g., femto cell, closed subscription cell, home base node, etc.) 120 can serve subscribing AT 122, connecting via data packet network 124 (e.g., Internet) to a core network 126. The E-UTRAN 102 can terminate a call to AT 106, for instance. Tight Interference over Thermal noise (IoT) control on an uplink (UL) channel can be achieved by a broadcast Overload Indication (OI) 130. Conventionally (e.g., Release-8), the OI 130 is sent over X2 interface between eNBs 104a-104c. In a heterogeneous network 132, X2 interface may not be available between the small base node 120 and a macro cell, depicted as eNB 104a. By provisioning the small base node 120 to receive (Rx) an over-the-air (OTA) broadcast from a macro cell eNB 104a similar to the AT 122, the small base node 120 can also perform transmit power control 134. As a side benefit, AT can also receive an OTA broadcast OI.

In an exemplary aspect, an OTA OI broadcast can be via a shortened Physical Broadcast Channel (PBCH). For instance, the OI can be sent by a binary signaling sent on two Resource Blocks (RBs) within the center six RBs in the midamble on an introduced physical channel.

Alternatively, the OI can utilize available resources (e.g., a reserved bit of 8 or 9 reserved for future compatibility) on a PBCH that is not shortened. Thereby, implementation is simplified by not requiring addition of a new channel. In one aspect, PBCH has 16-bit Cyclic Redundancy Check (CRC) and hence is fairly reliable once decoded.

In another aspect, better OI granularity is achievable by adding more bits in PBCH. For instance, more than one bit can be used to indicate subband OI using a predefined bitmap. Thus, ATs not occupying an overloaded subband do not reduce Transmit ("Tx") Power Spectral Density (PSD). In another aspect, the OI can be also indicated as a part of blind decoding with additional CRCs or OI based scrambling on PBCH. Utilizing a non-shortened PBICH can, however, encounter a latency associated with a 40 ms Transmit Time Interval (TTI).

In an additional aspect, rather than using either a shortened or non-shortened PBCH, the OI can be sent via Physical Hybrid-ARQ Indicator Channel (PHICH). As a first option, the AT monitors the neighbor cell PHICHs and if it can decode the PHICH, it indicates that its UL transmission may cause interference to neighbor cell. The PHICH also tells the UL resource occupancy of the neighbor as the PHICH resource mapping depends on the start Physical Resource Block (PRB) index. No new channel has to be added and no additional signal has to be sent. However, there is an overhead for the AT to get the neighbor cell PHICH search space, which implies the AT should read the neighbor cell PBCH.

As a second option for using the PHICH for the OI, the PHICH resource(s) can be reserved to send the OI. These PHICH resources can be orthogonalized across neighbors to achieve better Signal-to-Noise Ratio (SNR) penetration. These PHICH resources are not mapped to any UL transmission.

If needed multiple PHICH resources can be reserved and combined to send the OI to achieve better processing gain. In one aspect, at least one PHICH resource can be mapped for the OI into the center 1.08 MHz. Thus, AT can just use the center 1.08 MHz to get PHICH decoding. Accordingly, the PHICH resources for OI can be bandwidth agnostic such that AT does not need to know the bandwidth of a neighbor cell. In an exemplary aspect, the OI PHICH group and the Walsh code can be a function of the cell ID. Additional segments outside the center 1.08 MHz can be used for those ATs who have the knowledge of neighboring cell bandwidth.

Thus, no new channels are added. The PHICH can be sent very frequently with no latency issue. A challenge may exist if the AT is unable to read the neighbor cell PHICH, especially in interference limited scenario, which can be overcome by a combination of the following: (a) resource orthogonalization across neighbors (e.g., Time Division Multiplex (TDM) with neighbor cells using different time slots, Frequency Division Multiplex (FDM) with neighbor cells using different frequency resources, Code Division Multiplex (CDM) with neighbor cells using different Walsh codes, etc.); (b) resource repetition by using more than 1 PHICH resource to send the OI, which can be achieved with minimal receiver complexity by combining Log Likelihood Ratio (LLRs) across multiple PHICH resources before decision; and/or (c) PHICH interference cancellation (IC) whereby PHICH can be decoded in interference limited scenario.

Figure 2:
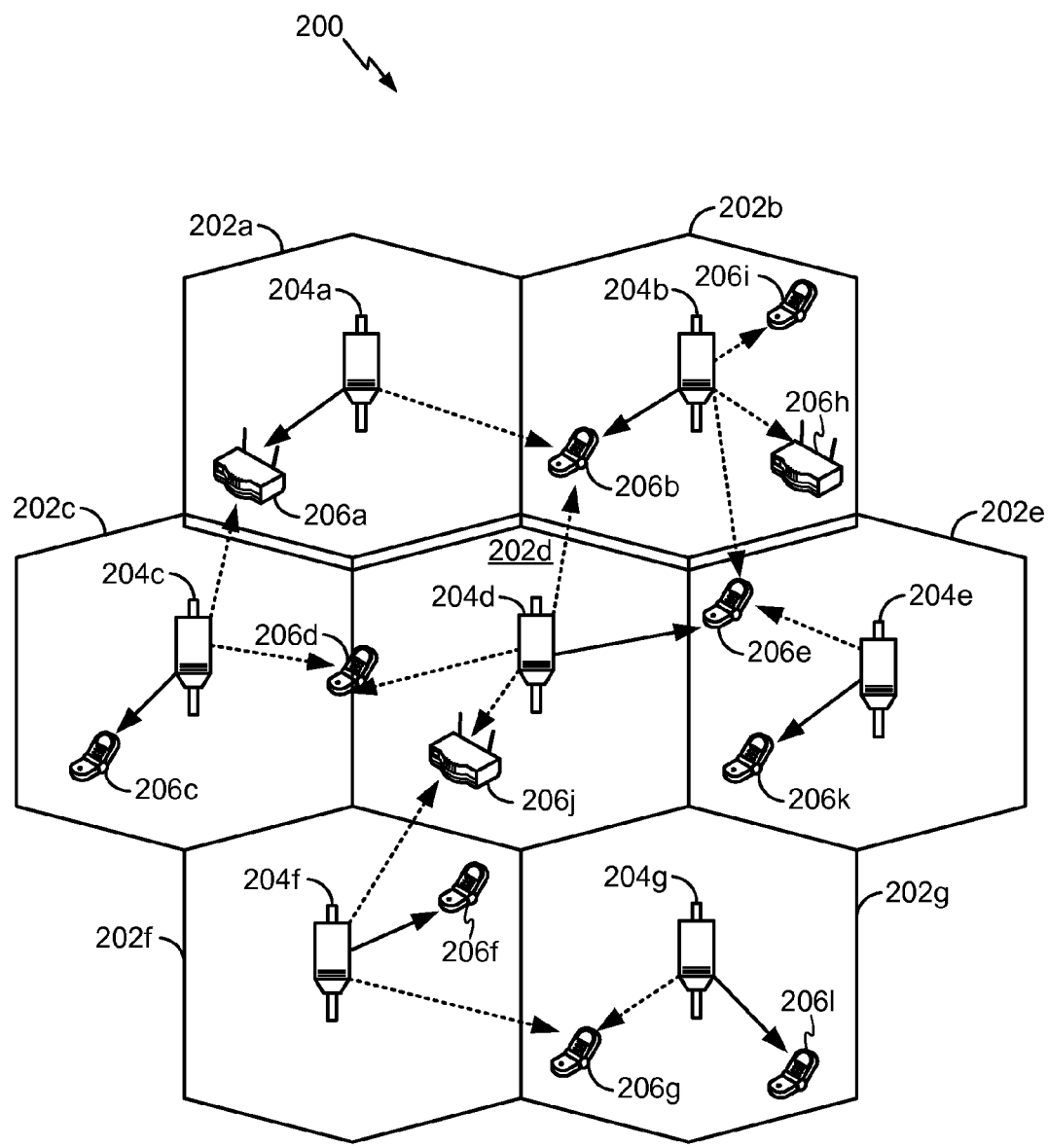
FIG. 2 illustrates a diagram of a wireless communication system configured to support a number of users.

FIG. 2 illustrates a wireless communication system 200, configured to support a number of users, in which the teachings herein may be implemented. The system 200 provides communication for multiple cells 202, such as, for example, macro cells 202a-202g, with each cell being serviced by a corresponding access node 204 (e.g., access nodes 204a-204g). As shown in FIG. 2, ATs 206 (e.g., ATs 206a-206l) may be dispersed at various locations throughout the system over time. Each AT 206 may communicate with one or more access nodes 204 on a forward link ("FL") and/or a reverse link ("RL") at a given moment, depending upon whether the AT 206 is active and whether it is in soft handoff, for example. The wireless communication system 200 may provide service over a large geographic region. For example, macro cells 202a-202g may cover a few blocks in a neighborhood.

Figure 3:
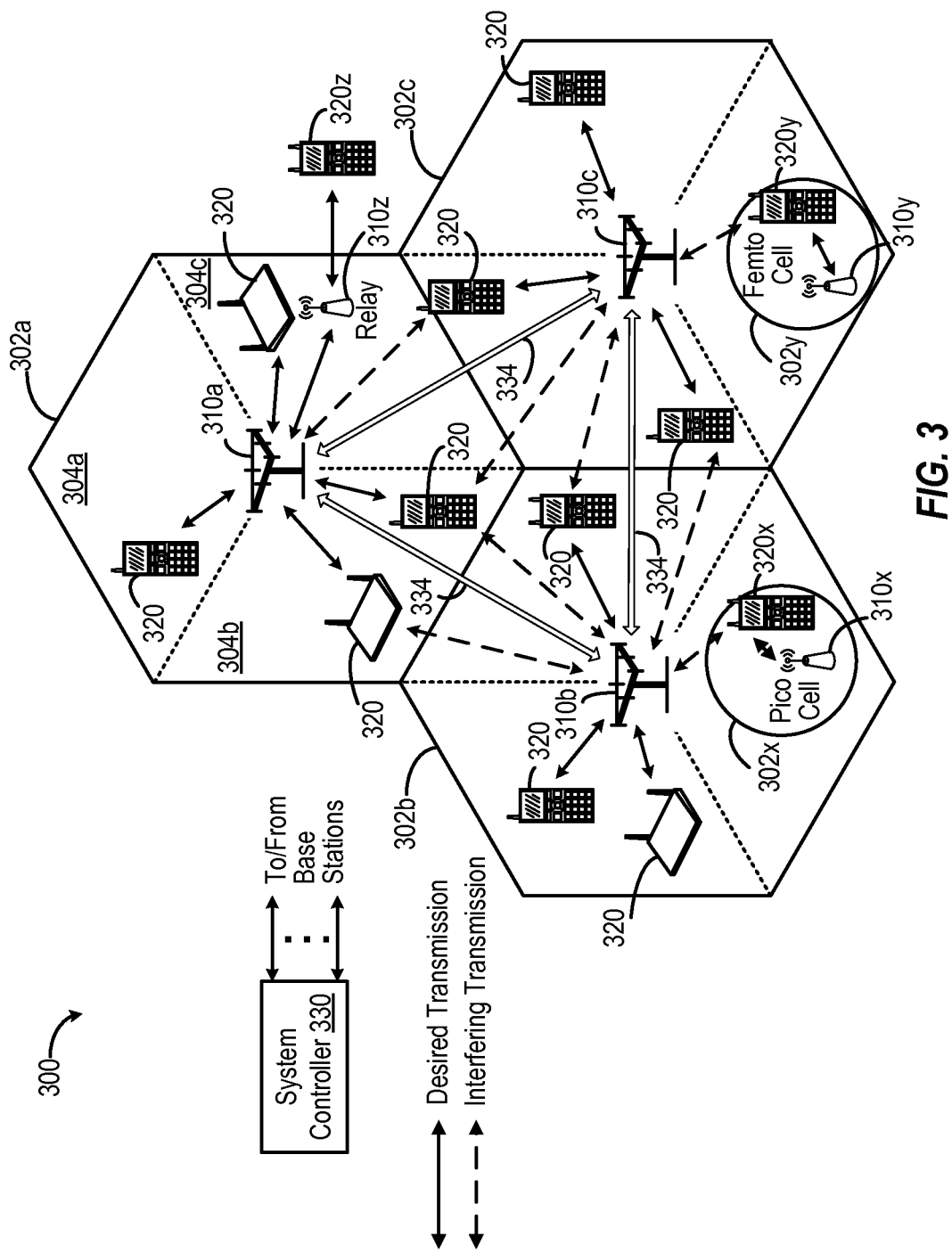
FIG. 3 illustrates a diagram of a wireless communication system comprising macro cells, femto cells and pico cells.

In the example shown in FIG. 3, base stations 310a, 310b and 310c may be macro base stations for macro cells 302a, 302b and 302c, respectively. The base station 310x may be a pico base station for a pico cell 302x communicating with a terminal 320x. A base station 310y may be a femto base station for a femto cell 302y communicating with terminal 320y. Although not shown in FIG. 3 for simplicity, the macro cells may overlap at the edges. The pico and femto cells may be located within the macro cells (as shown in FIG. 3) or may overlap with macro cells and/or other cells.

A wireless network 300 may also include relay stations, e.g., a relay station 310z that communicates with a terminal 320z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. The network controller 330 may be a single network entity or a collection of network entities. The network controller 330 may communicate with base stations 310 via a backhaul. A backhaul network communication 334 can facilitate point-to-point communication between base stations 310a-310c employing such a distributed architecture. Base stations 310a-310c may also communicate with one another, e.g., directly or indirectly via wireless or wireline backhaul.

The wireless network 300 may be a homogeneous network that includes only macro base stations (not shown in FIG. 3). The wireless network 300 may also be a heterogeneous network that includes base stations of different types, e.g., macro base stations, pico base stations, home base stations, relay stations, etc. These different types of base stations may have different transmit power levels, different coverage areas, and different impact on interference in the wireless network 300. For example, macro base stations may have a high transmit power level (e.g., twenty Watts) whereas pico and femto base stations may have a low transmit power level (e.g., three Watts). The techniques described herein may be used for homogeneous and heterogeneous networks.

Terminals 320 may be dispersed throughout the wireless network 300, and each terminal may be stationary or mobile. A terminal may also be referred to as an AT, a mobile station (MS), UE, a subscriber unit, a station, etc. A terminal may be a cellular phone, a personal digital assistant (PDA), a wireless modem, a wireless communication device, a handheld device, a laptop computer, a cordless phone, a Wireless Local Loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

The wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at the base station 310, where each group of antennas is responsible for communication with terminals 320 in a portion of the cell 302a, 302b, or 302c. For example, a base station 310 serving cell 302a can have a first antenna group corresponding to a sector 304a, a second antenna group corresponding to a sector 304b, and a third antenna group corresponding to a sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
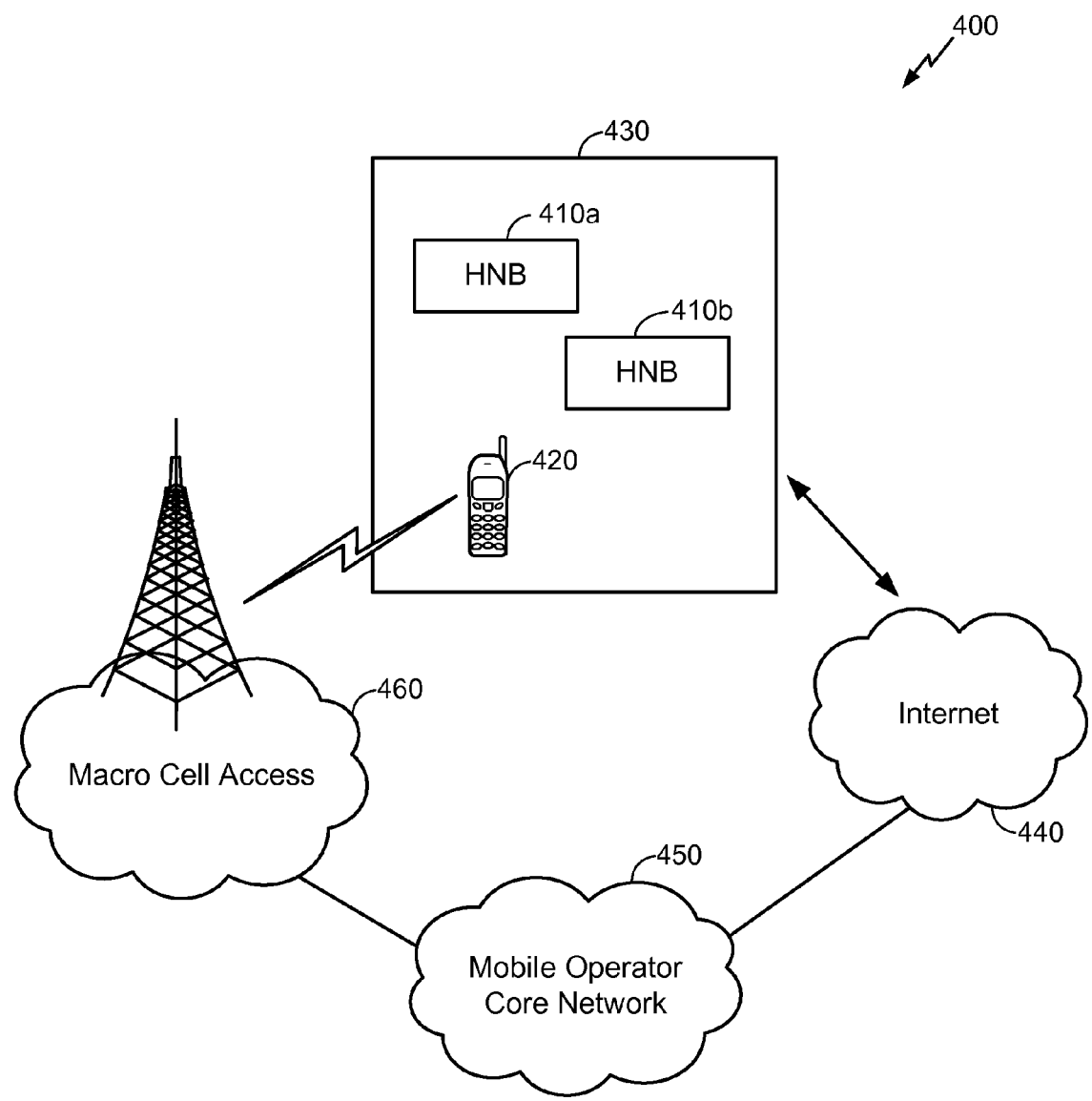
FIG. 4 illustrates a diagram of a communication system where one or more femto nodes are deployed within a network environment.

FIG. 4 illustrates an exemplary communication system 400 where one or more femto nodes are deployed within a network environment. Specifically, the system 400 includes multiple femto nodes 410 (e.g., femto nodes 410a and 410b) installed in a relatively small scale network environment (e.g., in one or more user residences 430). Each femto node 410 may be coupled to a wide area network 440 (e.g., the Internet) and a mobile operator core network 450 via a DSL router, a cable modem, a wireless link, or other connectivity means (not shown). As will be discussed below, each femto node 410 may be configured to serve an associated AT 420 and, optionally, alien AT(s) (not shown). In other words, access to femto nodes 410 may be restricted whereby a given AT 420 may be served by a set of designated (e.g., home) femto node(s) 410 but may not be served by any non-designated femto nodes 410 (e.g., a neighbor's femto node 410).

Figure 5:
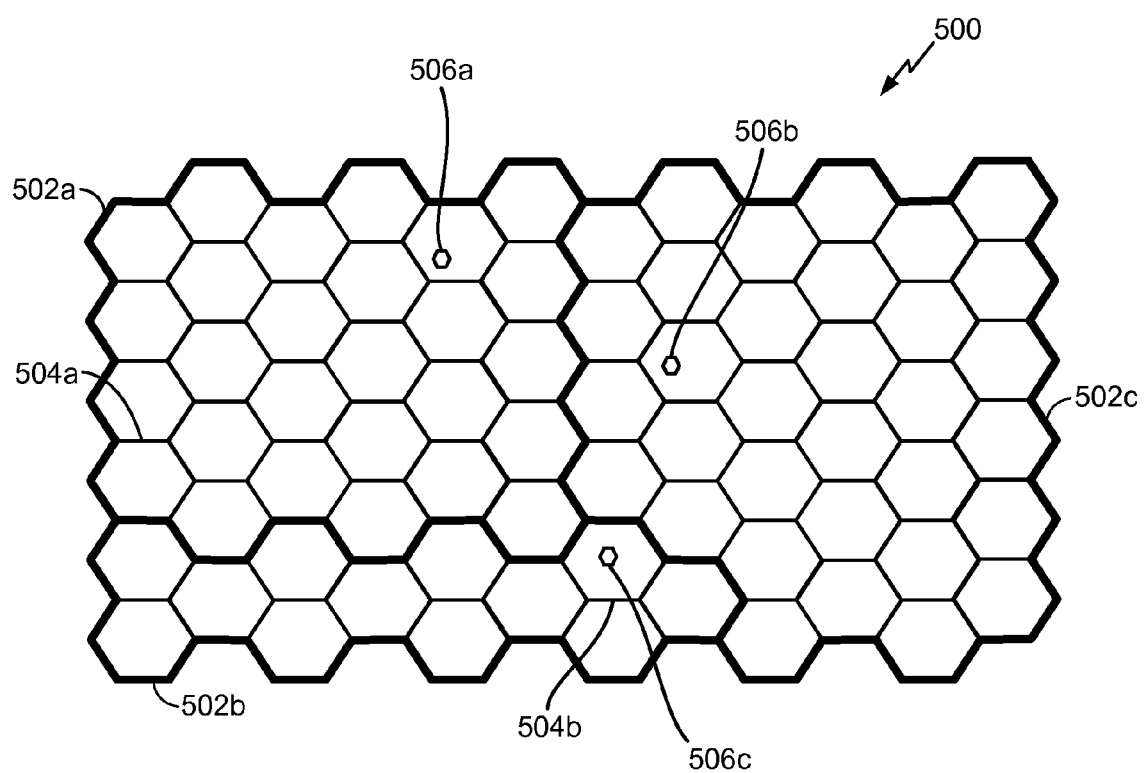
FIG. 5 illustrates a diagram of a coverage map where several tracking areas, routing areas or location areas are defined.

FIG. 5 illustrates an example of a coverage map 500 where several tracking areas 502 (or routing areas or location areas) are defined, each of which includes several macro coverage areas 504. Here, areas of coverage associated with tracking areas 502a, 502b, and 502c are delineated by the wide lines and the macro coverage areas 504 are represented by the hexagons. The tracking areas 502 also include femto coverage areas 506. In this example, each of the femto coverage areas 506 (e.g., femto coverage area 506c) is depicted within the macro coverage area 504 (e.g., macro coverage area 504b). It should be appreciated, however, that a femto coverage area 506 may not lie entirely within a macro coverage area 504. In practice, a large number of femto coverage areas 506 may be defined with a given tracking area 502 or macro coverage area 504. Also, one or more pico coverage areas (not shown) may be defined within a given tracking area 502 or macro coverage area 504.

Referring again to FIG. 4, the owner of a femto node 410 may subscribe to mobile service, such as, for example, 3G mobile service, offered through the mobile operator core network 450. In addition, an AT 420 may be capable of operating both in macro environments and in smaller scale (e.g., residential) network environments. In other words, depending on the current location of the AT 420, the AT 420 may be served by an access node 460 of the macro cell mobile network 450 or by any one of a set of femto nodes 410 (e.g., the femto nodes 410a and 410b that reside within a corresponding user residence 430). For example, when a subscriber is outside his home, he is served by a standard macro access node (e.g., node 460) and when the subscriber is at home, he is served by a femto node (e.g., node 410a). Here, it should be appreciated that a femto node 410 may be backward compatible with existing ATs 420.

A femto node 410 may be deployed on a single frequency or, in the alternative, on multiple frequencies. Depending on the particular configuration, the single frequency or one or more of the multiple frequencies may overlap with one or more frequencies used by a macro node (e.g., node 460).

In some aspects, an AT 420 may be configured to connect to a preferred femto node (e.g., the home femto node of the AT 420) whenever such connectivity is possible. For example, whenever the AT 420 is within the user's residence 430, it may be desired that the AT 420 communicate only with the home femto node 410.

In some aspects, if the AT 420 operates within the macro cellular network 450 but is not residing on its most preferred network (e.g., as defined in a preferred roaming list), the AT 420 may continue to search for the most preferred network (e.g., the preferred femto node 410) using a Better System Reselection ("BSR"), which may involve a periodic scanning of available systems to determine whether better systems are currently available, and subsequent efforts to associate with such preferred systems. With the acquisition entry, the AT 420 may limit the search for specific band and channel. For example, the search for the most preferred system may be repeated periodically. Upon discovery of a preferred femto node 410, the AT 420 selects the femto node 410 for camping within its coverage area.

A femto node may be restricted in some aspects. For example, a given femto node may only provide certain services to certain ATs. In deployments with so-called restricted (or closed) association, a given AT may only be served by the macro cell mobile network and a defined set of femto nodes (e.g., the femto nodes 410 that reside within the corresponding user residence 430). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of ATs. This set may be temporarily or permanently extended as necessary. In some aspects, a Closed Subscriber Group ("CSG") may be defined as the set of access nodes (e.g., femto nodes) that share a common access control list of ATs. A channel on which all femto nodes (or all restricted femto nodes) in a region operate may be referred to as a femto channel.

Various relationships may thus exist between a given femto node and a given AT. For example, from the perspective of an AT, an open femto node may refer to a femto node with no restricted association. A restricted femto node may refer to a femto node that is restricted in some manner (e.g., restricted for association and/or registration). A home femto node may refer to a femto node on which the AT is authorized to access and operate on. A guest femto node may refer to a femto node on which an AT is temporarily authorized to access or operate on. An alien femto node may refer to a femto node on which the AT is not authorized to access or operate on, except for perhaps emergency situations (e.g., 911 calls).

From a restricted femto node perspective, a home AT may refer to an AT that authorized to access the restricted femto node. A guest AT may refer to an AT with temporary access to the restricted femto node. An alien AT may refer to an AT that does not have permission to access the restricted femto node, except for perhaps emergency situations, for example, such as 911 calls (e.g., an AT that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given AT, and so on.

A wireless multiple-access communication system may simultaneously support communication for multiple wireless ATs. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 6:
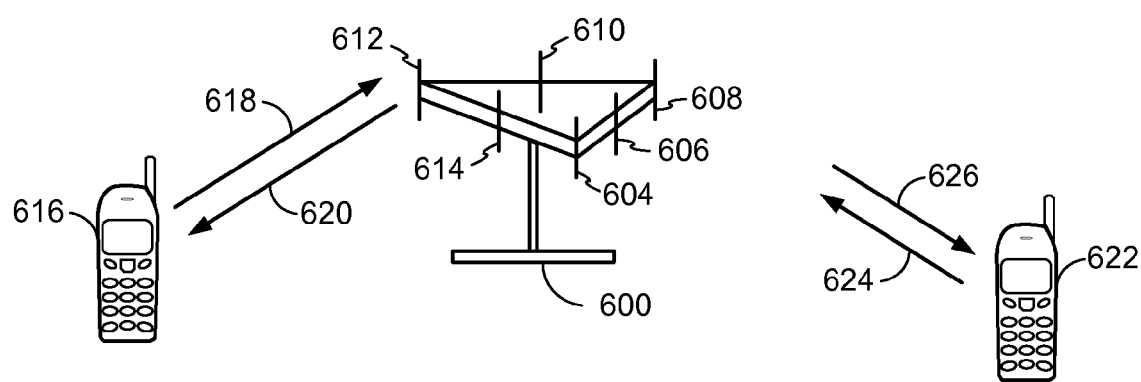
FIG. 6 illustrates a diagram of a multiple access wireless communication system.

Referring to FIG. 6, a multiple access wireless communication system according to one aspect is illustrated. An access point (AP) 600 includes multiple antenna groups, one including antennas 604 and 606, another including antennas 608 and 610, and an additional including antennas 612 and 614. In FIG. 6, only two antennas are shown for each antenna group, however, more or fewer antennas may be utilized for each antenna group. An AT 616 is in communication with antennas 612 and 614, where antennas 612 and 614 transmit information to the AT 616 over a forward link 620 and receive information from the AT 616 over a reverse link 618. An AT 622 is in communication with the antennas 606 and 608, where the antennas 606 and 608 transmit information to the AT 622 over a forward link 626 and receive information from the AT 622 over a reverse link 624. In a Frequency Division Duplex ("FDD") system, communication links 618, 620, 624 and 626 may use different frequencies for communication. For example, the forward link 620 may use a different frequency than that used by the reverse link 618.

Each group of antennas and/or the area in which they are designed to communicate is often referred to as a sector of the access point. In the aspect, antenna groups each are designed to communicate to ATs in a sector, of the areas covered by an access point 600.

In communication over the forward links 620 and 626, the transmitting antennas of the access point 600 utilize beamforming in order to improve the signal-to-noise ratio of forward links for the different ATs 616 and 622. Also, an access point using beamforming to transmit to ATs scattered randomly through its coverage causes less interference to ATs in neighboring cells than an access point transmitting through a single antenna to all of its ATs.

An access point may be a fixed station used for communicating with the terminals and may also be referred to as an access point, a Node B, or some other terminology.

A MIMO (Multiple Input Multiple Output) system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 7:
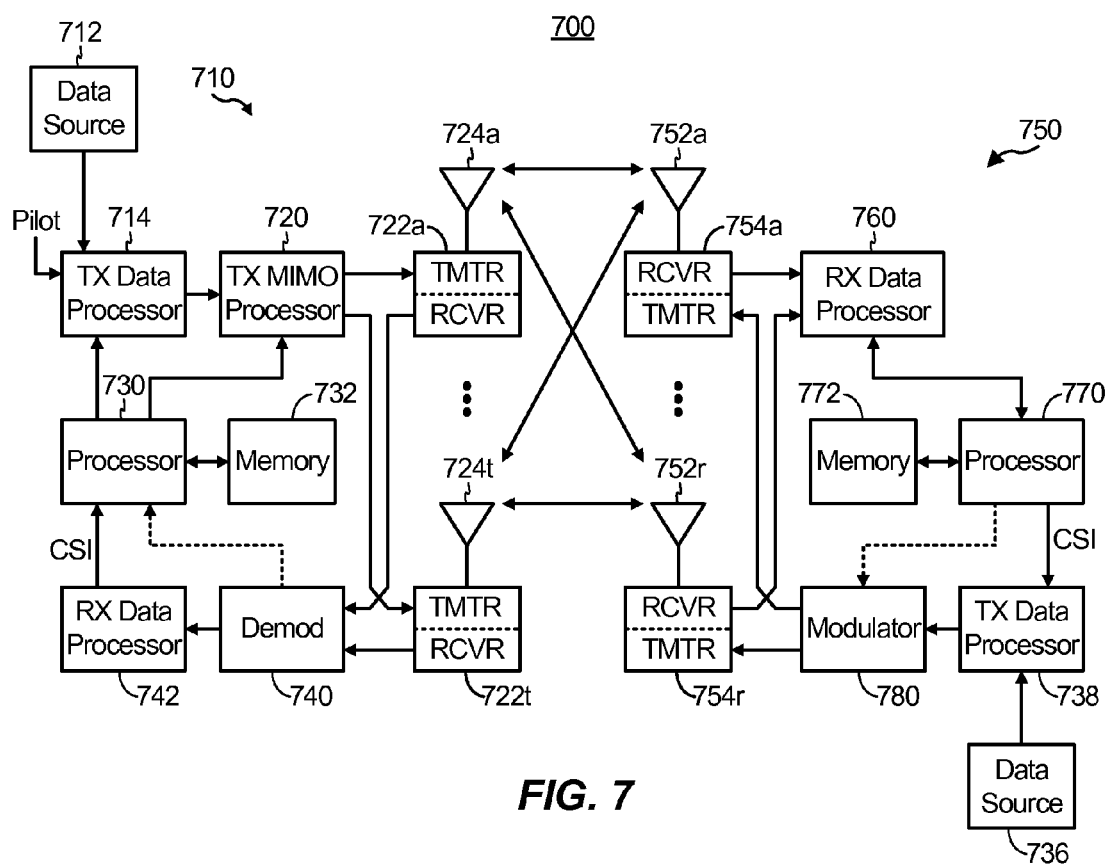
FIG. 7 illustrates a schematic diagram of a node and terminal in a Multiple Input Multiple Output (MIMO) communication system.

The teachings herein may be incorporated into a node (e.g., a device) employing various components for communicating with at least one other node. FIG. 7 is a block diagram of an embodiment of a transmitter system 710 (also known as the access point) and a receiver system 750 (also known as AT) in a MIMO system 700. At the transmitter system 710, traffic data for a number of data streams is provided from a data source 712 to a transmit (TX) data processor 714.

In an embodiment, each data stream is transmitted over a respective transmit antenna. The TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 730.

The modulation symbols for all data streams are then provided to a TX MIMO processor 720, which may further process the modulation symbols (e.g., for OFDM). The TX MIMO processor 720 then provides NT modulation symbol streams to NT transmitters (TMTR) 722a through 722t. In certain embodiments, the TX MIMO processor 720 applies beamforming weights to the symbols of the data streams and to the antenna from which the symbol is being transmitted.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 730. The instructions as well as the data for processor 730 may be stored in memory 732.

At the receiver system 750, the transmitted modulated signals are received by NR antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

A RX data processor 760 then receives and processes the NR received symbol streams from the NR receivers 754 based on a particular receiver processing technique to provide NT "detected" symbol streams. The RX data processor 760 then demodulates, deinterleaves, and decodes each detected symbol stream to recover the traffic data for the data stream. The processing by the RX data processor 760 is complementary to that performed by the TX MIMO processor 720 and the TX data processor 714 at the transmitter system 710.

A processor 770 periodically determines which pre-coding matrix to use, discussed further below. The processor 770 formulates a reverse link message comprising a matrix index portion and a rank value portion.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to the transmitter system 710.

A processor 770 periodically determines which precoding matrix to use, discussed further below. The processor 770 formulates a reverse link message comprising a matrix index portion and a rank value portion. Memory 772 may store instructions that when executed by processor 770 result in formulating the reverse link message.

Figure 8:
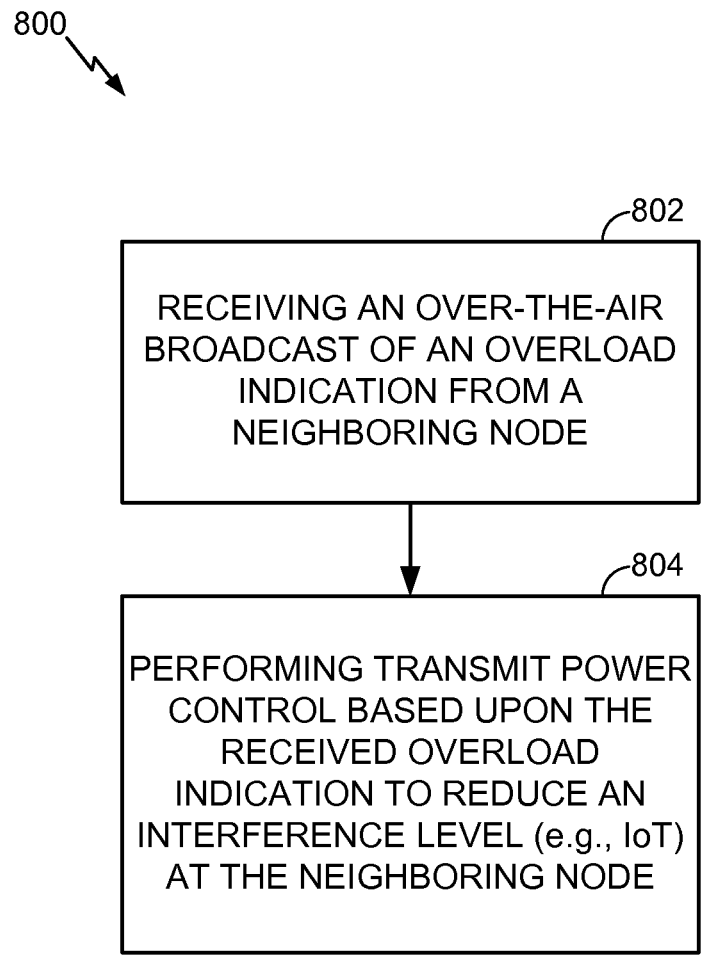
FIG. 8 illustrates an example methodology for performing uplink transmit power control.

In accordance with one or more aspects of the embodiments described herein, there is provided a method for performing uplink transmit power control. With reference to FIG. 8, there is shown a methodology 800 that facilitates the transmit power control based upon a broadcast overload indication. It is noted that method 800 may be performed at an AT. In the alternative, or in addition, the method 800 may be performed at a small base node (e.g., a selected one of a femto access point, a home base node, a closed subscription cell, etc.). At 802, an OTA broadcast of an OI is received from a neighboring node. At 804, transmit power control is performed based upon the received overload indication to reduce an interference level (e.g., IoT noise) at the neighboring node. In related aspects, one or more processors may be employed to execute code stored on a computer-readable storage medium to implement the acts described herein.

Figure 9:
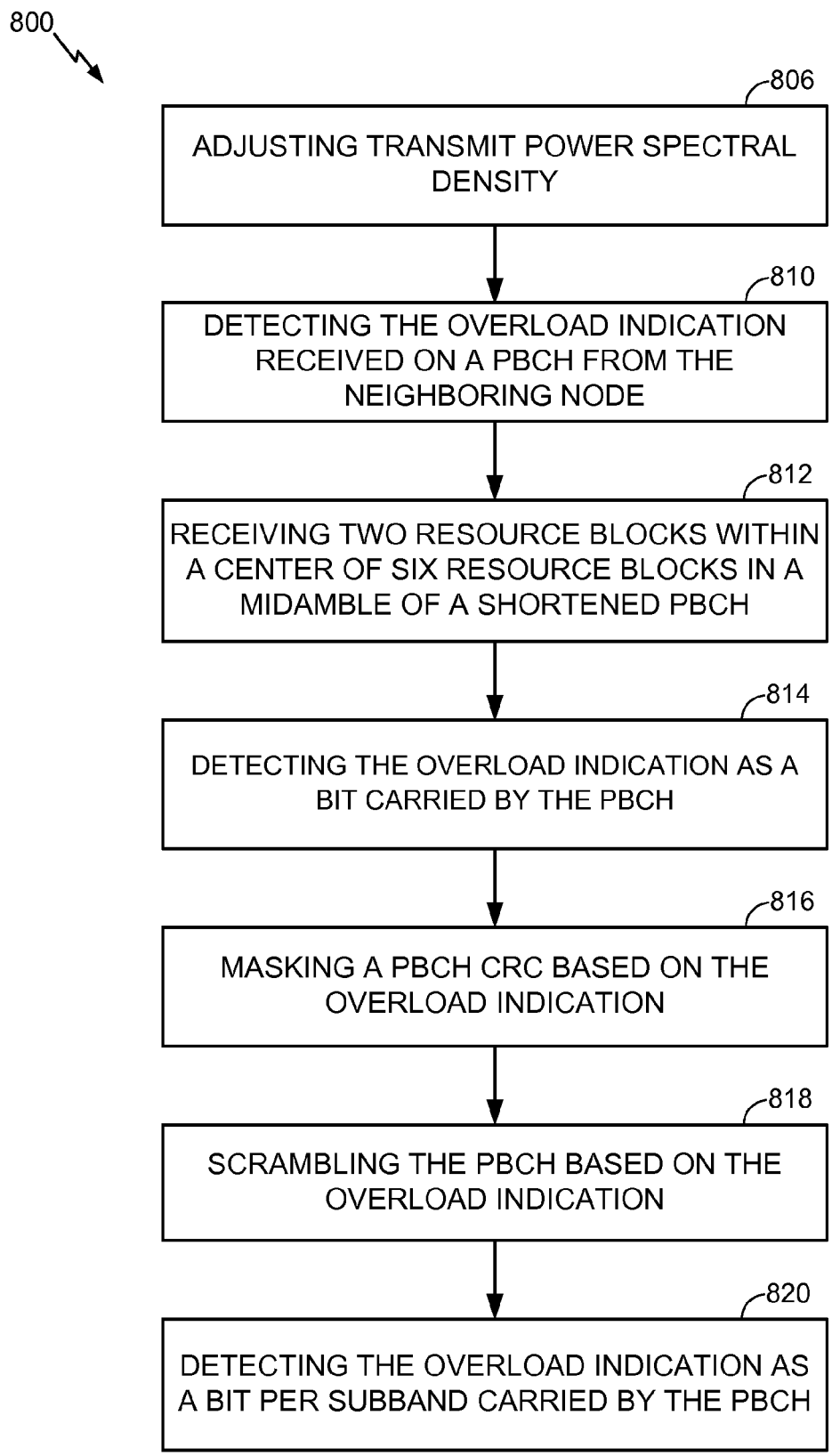
FIGS. 9-11 illustrate further aspects of the methodology of FIG. 8.

With reference to FIG. 9, performing the transmit power control may involve, at 806, adjusting transmit power spectral density. In one embodiment, the method 800 may involve, at 810, detecting the overload indication received on a physical broadcast channel (PBCH) from the neighboring node. The method 800 may involve, at 812, receiving two resource blocks within a center of six resource blocks in a midamble of a shortened PBCH. The method 800 may involve, at 814, detecting the overload indication as a bit carried by the PBCH. The method 800 may involve, at 816, masking a PBCH Cyclic Redundancy Check (CRC) based on the overload indication. The method 800 may involve, at 818, scrambling the PBCH based on the overload indication. The method 800 may involve, at 820, detecting the overload indication as a bit per subband carried by the PBCH.

Figure 10:
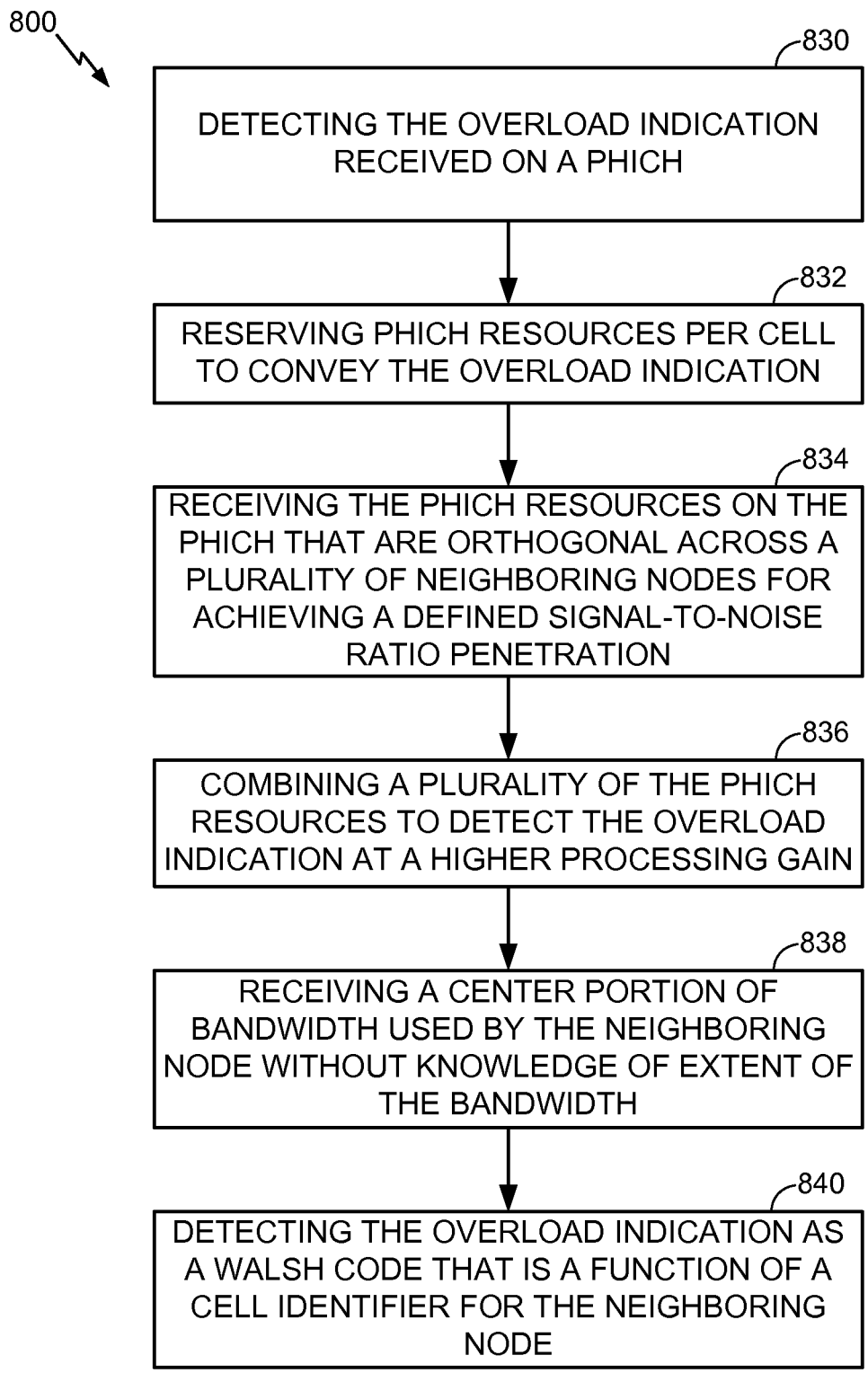

With reference to FIG. 10, in another embodiment, the method 800 may involve, at 830, detecting the overload indication received on a physical hybrid automatic repeat request indicator channel (PHICH). In related aspects, the PHICH may be TDM modulated in a different time slot from a plurality of neighboring nodes, or FDM modulated in a different frequency resource from a plurality of neighboring nodes, or CDM modulated in a different Walsh code from a plurality of neighboring nodes. The method 800 may involve, at 832, reserving PHICH resources per cell to convey the overload indication. The method 800 may involve, at 834, receiving the PHICH resources on the PHICH that are orthogonal across a plurality of neighboring nodes for achieving a defined signal-to-noise ratio penetration. The method 800 may involve, at 836, combining a plurality of the PHICH resources to detect the overload indication at a higher processing gain. The method 800 may involve, at 838, receiving a center portion of bandwidth used by the neighboring node without knowledge of extent of the bandwidth. The method 800 may involve, at 840, detecting the overload indication as a Walsh code that is a function of a cell identifier for the neighboring node.

Figure 11:
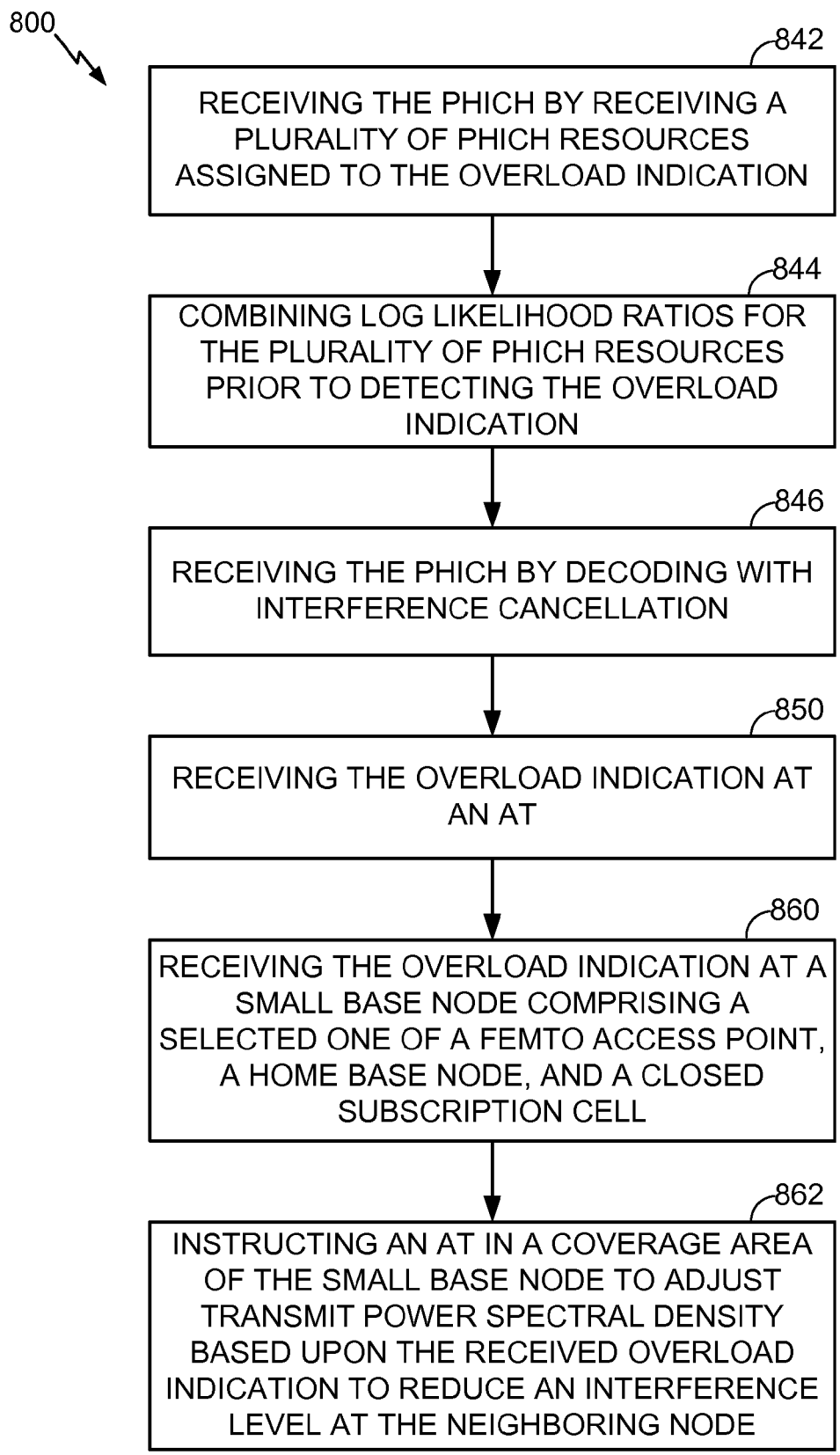

With reference to FIG. 11, the method 800 may involve, at 842, receiving the PHICH by receiving a plurality of PHICH resources assigned to the overload indication. The method 800 may involve, at 844, combining log likelihood ratios for the plurality of PHICH resources prior to detecting the overload indication. The method 800 may involve, at 846, receiving the PHICH by decoding with interference cancellation. The method 800 may involve, at 850, receiving the overload indication at an AT. The method 800 may involve, at 860, receiving the overload indication at a small base node comprising a selected one of a femto access point, a home base node, and a closed subscription cell. The method 800 may involve, at 862, instructing an AT in a coverage area of the small base node to adjust transmit power spectral density based upon the received overload indication to reduce an interference level at the neighboring node.

Figure 12:
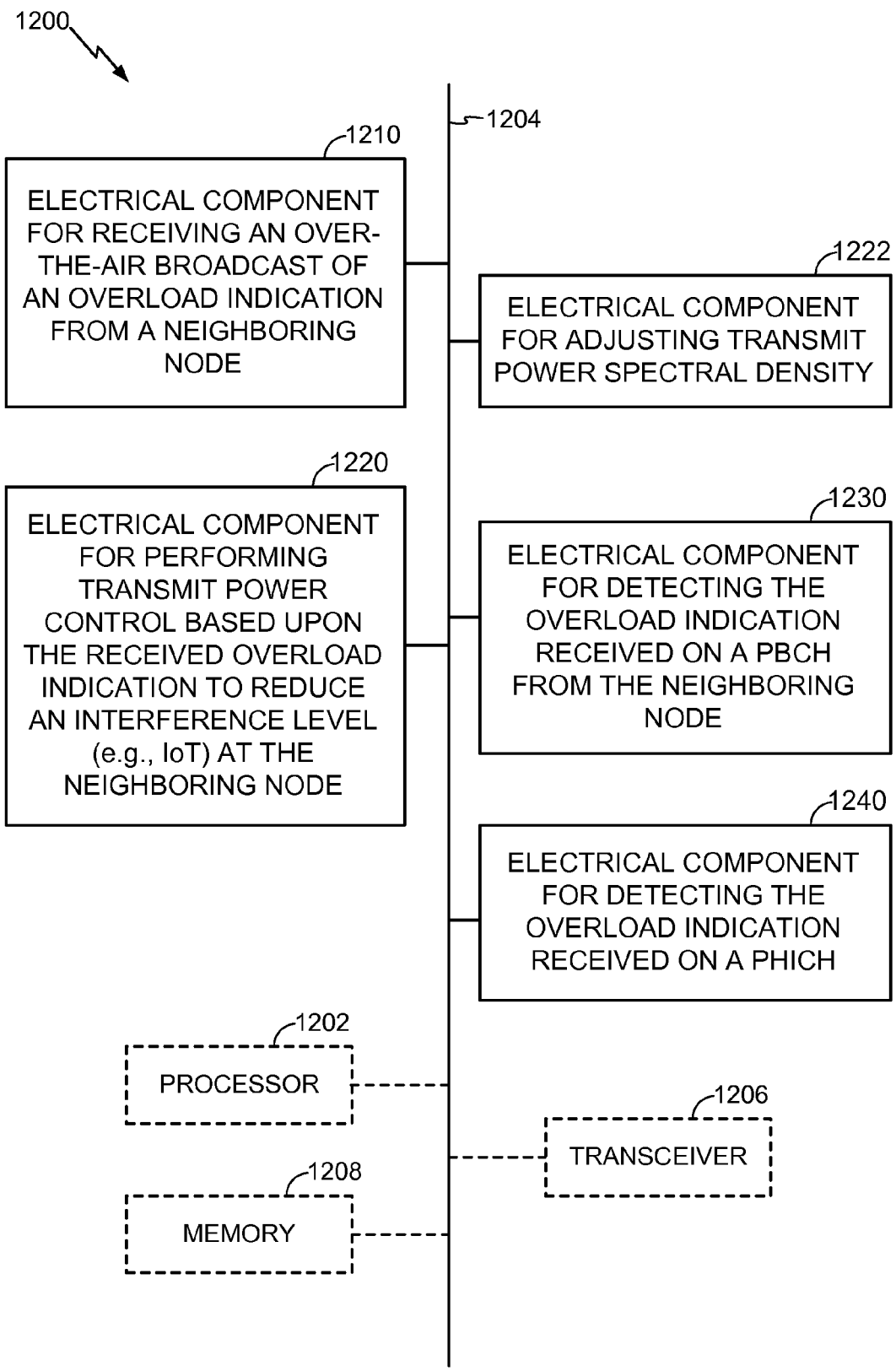
FIG. 12 shows an exemplary apparatus for performing uplink transmit power control.

In accordance with one or more aspects of the embodiments described herein, there are provided devices and apparatuses for performing uplink transmit power control. With reference to FIG. 12, there is provided an exemplary apparatus 1200 that may be configured as a communication device or as a processor or similar device for use within the communication device. For example, the apparatus 1200 may comprise an AT. In another example, the apparatus 1200 may comprise a small base node (e.g., a selected one of a femto access point, a home base node, a closed subscription cell, etc.). As depicted, the apparatus 1200 may include functional blocks that can represent functions implemented by a processor, software, or combination thereof (e.g., firmware).

As illustrated in FIG. 12, the apparatus 1200 may comprise an electrical component or module 1210 for receiving an over-the-air broadcast of an overload indication from a neighboring node. The apparatus 1200 may comprise an electrical component 1220 for performing transmit power control based upon the received overload indication to reduce an interference level (e.g., IoT) at the neighboring node. In related aspects, the electrical component 1220 may comprise an electrical component 1222 for adjusting transmit power spectral density. The apparatus 1200 may comprise an electrical component 1230 for detecting the overload indication received on a PBCH from the neighboring node. In the alternative, or in addition, the apparatus 1200 may comprise an electrical component 1240 for detecting the overload indication received on a PHICH.

The apparatus 1200 may optionally include a processor component 1202 having at least one processor, in the case of the apparatus 1200 configured as a communication network entity, rather than as a processor. The processor 1202, in such case, may be in operative communication with the components 1210-1240 via a bus 1204 or similar communication coupling. The processor 1202 may effect initiation and scheduling of the processes or functions performed by the components 1210-1240.

In related aspects, the apparatus 1200 may include a transceiver component 1206. A stand alone receiver and/or stand alone transmitter may be used in lieu of or in conjunction with the transceiver 1206. In further related aspects, the apparatus 1200 may optionally include a component for storing information, such as, for example, a memory 1208. The computer readable medium or the memory component 1208 may be operatively coupled to the other components of the apparatus 1200 via the bus 1204 or the like. The memory component 1208 may be adapted to store computer readable instructions and data for effecting the processes and behavior of the components 1210-1240, and subcomponents thereof, or the processor 1202, or the methods disclosed herein. The memory component 1208 may retain instructions for executing functions associated with the components 1210-1240. While shown as being external to the memory component 1208, it is to be understood that one or more of the components 1210-1240 can exist within the memory component 1208.

Figure 13:
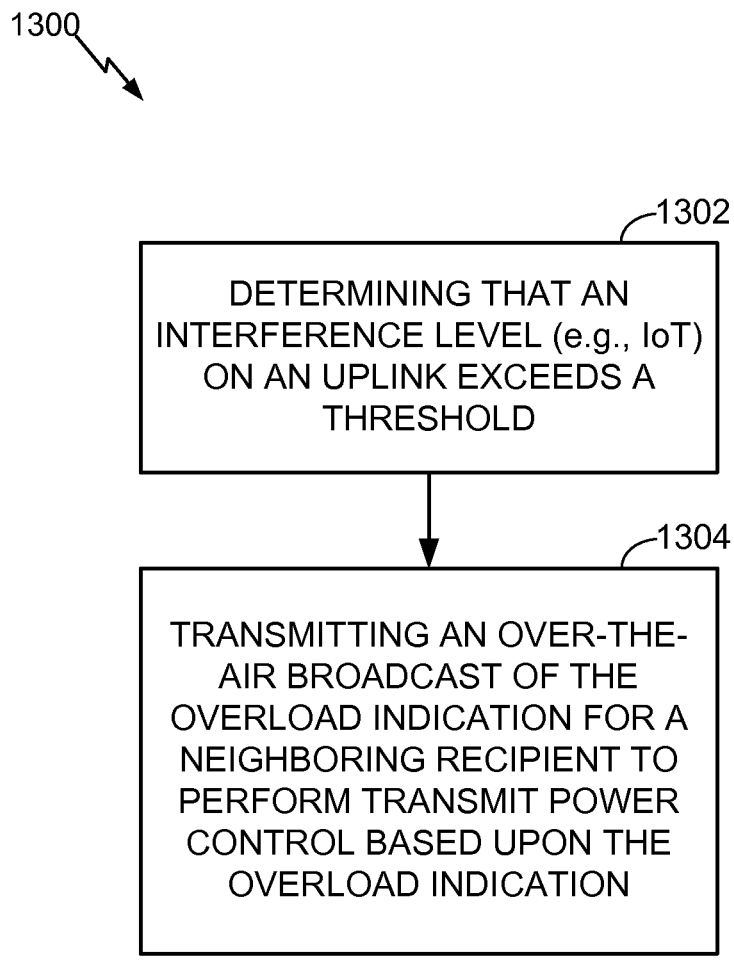
FIG. 13 illustrates an example methodology for broadcasting an overload indication.

In accordance with one or more aspects of the embodiments described herein, there is provided a method for broadcasting an overload indication. With reference to FIG. 13, there is shown a methodology 1300 that may be performed at a macro base station and/or a small base node (e.g., a selected one of a femto access point, a home base node, a closed subscription cell, etc.) that neighbors a given AT or a given small base node that serves the given AT. At 1302, the method 1300 may involve determining that an interference level on an uplink exceeds a threshold. At 1304, an over-the-air broadcast of the overload indication is transmitted for a neighboring recipient to perform transmit power control based upon the overload indication.

Figure 14:
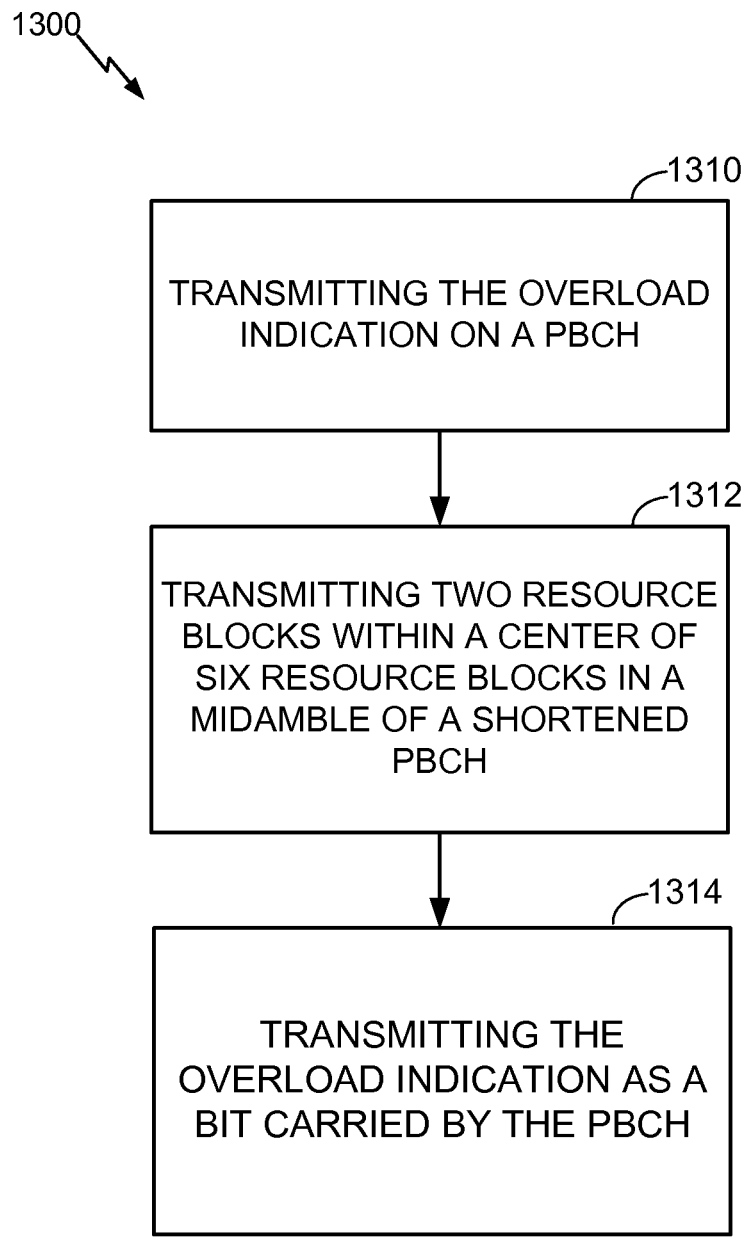
FIGS. 14-15 illustrate further aspects of the methodology of FIG. 13.
Figure 15:
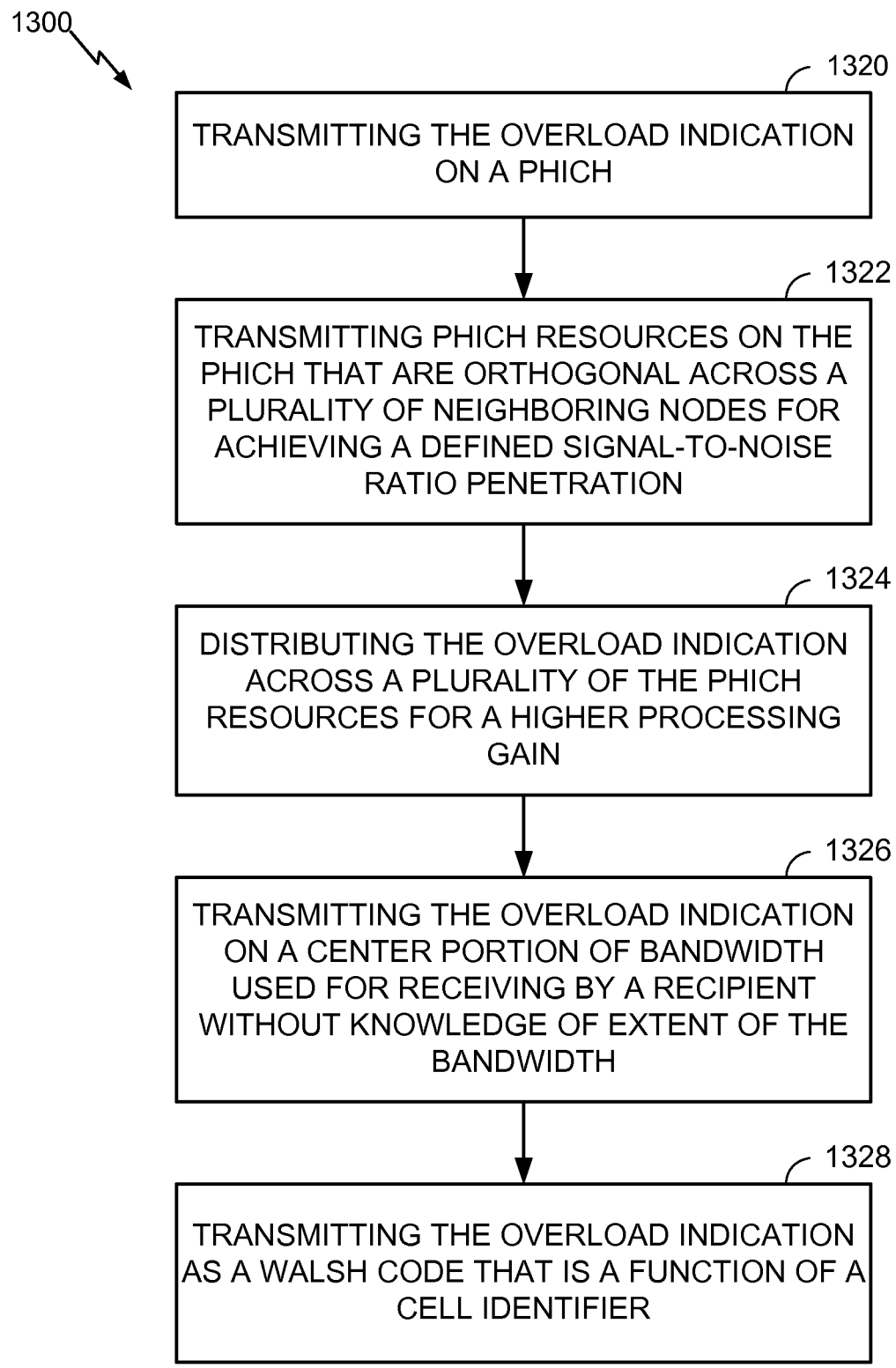

With reference to FIG. 14, in one embodiment, the method 1300 may involve, at 1310, transmitting the overload indication on a PBCH. The method 1300 may involve, at 1312, transmitting two resource blocks within a center of six resource blocks in a midamble of a shortened PBCH. The method 1300 may involve, at 1314, transmitting the overload indication as a bit carried by the PBCH. With reference to FIG. 15, in another embodiment, the method 1300 may involve, at 1320, transmitting the overload indication on a PHICH. In related aspects, the PHICH may be TDM modulated in a different time slot from a plurality of neighboring nodes, or FDM modulated in a different frequency resource from a plurality of neighboring nodes, or CDM modulated in a different Walsh code from a plurality of neighboring nodes. The method 1300 may involve, at 1322, transmitting PHICH resources on the PHICH that are orthogonal across a plurality of neighboring nodes for achieving a defined signal-to-noise ratio penetration. The method 1300 may involve, at 1324, distributing the overload indication across a plurality of the PHICH resources for a higher processing gain. The method 1300 may involve, at 1326, transmitting the overload indication on a center portion of bandwidth used for receiving by a recipient without knowledge of extent of the bandwidth. The method 1300 may involve, at 1328, transmitting the overload indication as a Walsh code that is a function of a cell identifier.

Figure 16:
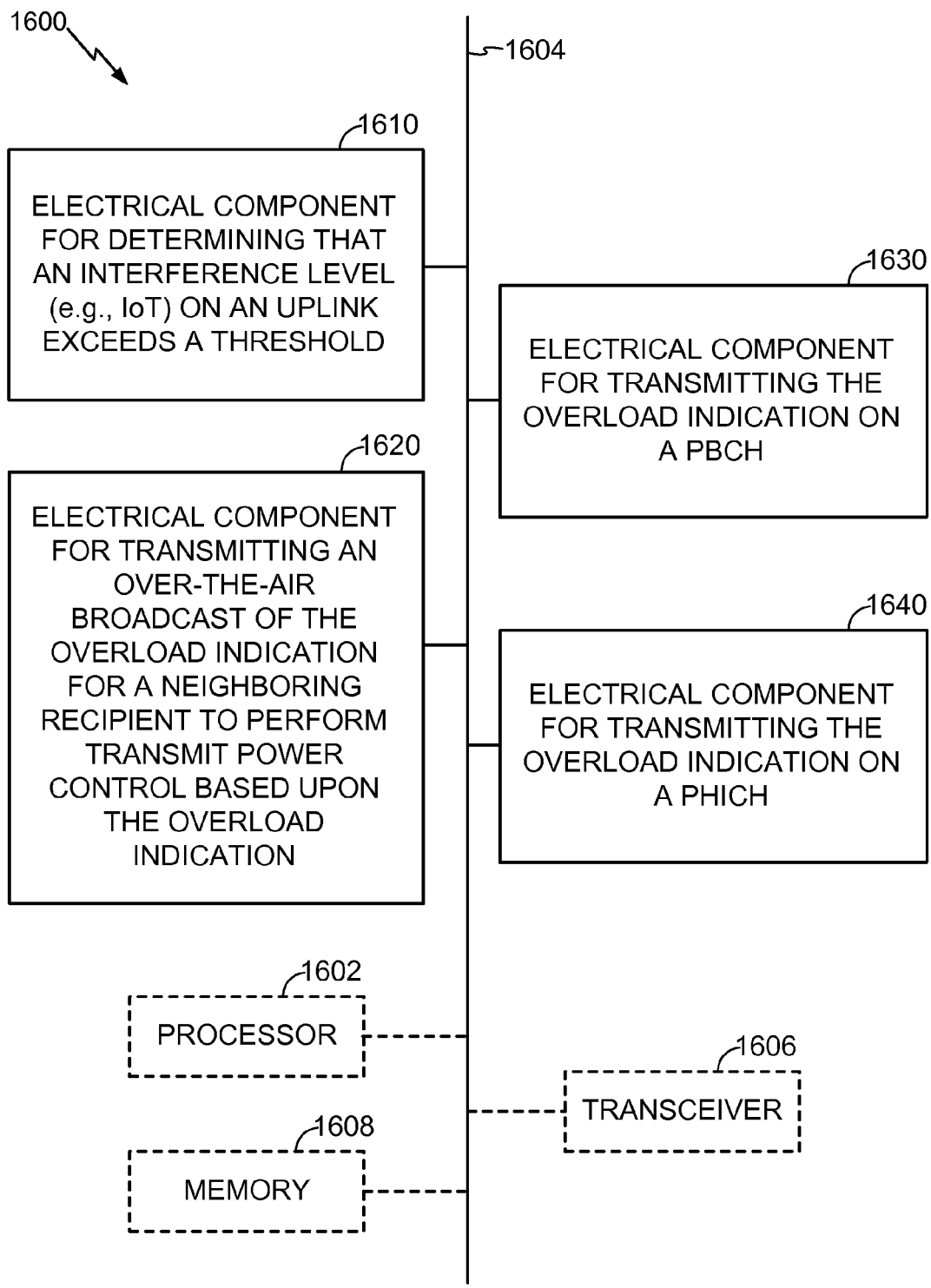
FIG. 16 shows an exemplary apparatus for broadcasting an overload indication.

In accordance with one or more aspects of the embodiments described herein, there are provided devices and apparatuses for broadcasting an overload indication. With reference to FIG. 16, there is provided an exemplary apparatus 1600 that may be configured as a communication device or as a processor or similar device for use within the communication device. For example, the apparatus 1600 may comprise a macro base station and/or a small base node. As depicted, the apparatus 1600 may include functional blocks that can represent functions implemented by a processor, software, or combination thereof (e.g., firmware).

As illustrated in FIG. 16, the apparatus 1600 may comprise an electrical component or module 1610 for determining that an interference level (e.g., IoT) on an uplink exceeds a threshold. The apparatus 1600 may comprise an electrical component 1620 for transmitting an over-the-air broadcast of the overload indication for a neighboring recipient to perform transmit power control based upon the overload indication. In related aspects, the apparatus 1600 may comprise an electrical component 1630 for transmitting the overload indication on a PBCH. In the alternative, or in addition, the apparatus 1600 may comprise an electrical component 1640 for transmitting the overload indication on a PHICH.

The apparatus 1600 may optionally include a processor component 1602 having at least one processor, in the case of the apparatus 1600 configured as a communication network entity, rather than as a processor. The processor 1602, in such case, may be in operative communication with the components 1610-1640 via a bus 1604 or similar communication coupling. The processor 1602 may effect initiation and scheduling of the processes or functions performed by the components 1610-1640.

In related aspects, the apparatus 1600 may include a transceiver component 1606. A stand alone receiver and/or stand alone transmitter may be used in lieu of or in conjunction with the transceiver 1606. In further related aspects, the apparatus 1600 may optionally include a component for storing information, such as, for example, a memory 1608. The computer readable medium or the memory component 1608 may be operatively coupled to the other components of the apparatus 1600 via the bus 1604 or the like. The memory component 1608 may be adapted to store computer readable instructions and data for effecting the processes and behavior of the components 1610-1640, and subcomponents thereof, or the processor 1602, or the methods disclosed herein. The memory component 1608 may retain instructions for executing functions associated with the components 1610-1640. While shown as being external to the memory component 1608, it is to be understood that one or more of the components 1610-1640 can exist within the memory component 1608.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, PDAs, and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above should also be included within the scope of computer-readable media.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method of performing uplink transmit power control, comprising:
   receiving an over-the-air broadcast of an overload indication from a neighboring node;
   detecting the overload indication received on a physical broadcast channel (PBCH) from the neighboring node, wherein the receiving comprises receiving two resource blocks within a center of six resource blocks in a midamble of a shortened PBCH; and
   performing transmit power control based upon the received overload indication to reduce an interference level at the neighboring node.

2. The method of claim 1, wherein performing the transmit power control comprises adjusting transmit power spectral density.

3. The method of claim 1, wherein the interference level comprises Interference over Thermal (IoT) noise.

4. The method of claim 1, further comprising detecting the overload indication as a bit carried by the PBCH.

5. The method of claim 1, wherein receiving comprises receiving the overload indication at an access terminal.

6. The method of claim 1, wherein receiving comprises receiving the overload indication at a small base node comprising a selected one of a femto access point, a home base node, and a closed subscription cell.

7. The method of claim 5, wherein performing comprises instructing an access terminal in a coverage area of the small base node to adjust transmit power spectral density based upon the received overload indication to reduce an interference level at the neighboring node.

8. A method of performing uplink transmit power control, comprising:
   receiving an over-the-air broadcast of an overload indication from a neighboring node,
   detecting the overload indication received on a physical broadcast channel (PBCH) from the neighboring node;
   masking a PBCH Cyclic Redundancy Check (CRC) based on the overload indication; and
   performing transmit power control based upon the received overload indication to reduce an interference level at the neighboring node.

9. A method of performing uplink transmit power control, comprising:
   receiving an over-the-air broadcast of an overload indication from a neighboring node;
   detecting the overload indication received on a physical broadcast channel (PBCH) from the neighboring node;
   scrambling the PBCH based on the overload indication; and
   performing transmit power control based upon the received overload indication to reduce an interference level at the neighboring node.

10. A method of performing uplink transmit power control, comprising:
    receiving an over-the-air broadcast of an overload indication from a neighboring node;
    detecting the overload indication received on a physical broadcast channel (PBCH) from the neighboring node as a bit per subband carried by the PBCH; and
    performing transmit power control based upon the received overload indication to reduce an interference level at the neighboring node.

11. A method of performing uplink transmit power control, comprising:
    receiving an over-the-air broadcast of an overload indication from a neighboring node;
    detecting the overload indication received on a physical hybrid automatic repeat request indicator channel (PHICH);
    reserving PHICH resources per cell to convey the overload indication; and
    performing transmit power control based upon the received overload indication to reduce an interference level at the neighboring node.

12. The method of claim 11, further comprising receiving the PHICH resources on the PHICH that are orthogonal across a plurality of neighboring nodes for achieving a defined signal-to-noise ratio penetration.

13. The method of claim 11, further comprising combining a plurality of the PHICH resources to detect the overload indication.

14. The method of claim 11, further comprising receiving a center portion of bandwidth used by the neighboring node.

15. The method of claim 11, further comprising detecting the overload indication as a Walsh code that is a function of a cell identifier for the neighboring node.

16. The method of claim 11, wherein the PHICH is time division multiplexed (TDM) modulated in a different time slot from a plurality of neighboring nodes.

17. The method of claim 11, wherein the PHICH is frequency division multiplexed (FDM) modulated in a different frequency resource from a plurality of neighboring nodes.

18. The method of claim 11, wherein the PHICH is code division multiplexed (CDM) modulated in a different Walsh code from a plurality of neighboring nodes.

19. The method of claim 11, further comprising:
receiving the PHICH by receiving a plurality of PHICH resources assigned to the overload indication; and
combining log likelihood ratios for the plurality of PHICH resources prior to detecting the overload indication.

20. The method of claim 11, further comprising receiving the PHICH by decoding with interference cancellation.

21. A computer program product, comprising:
a non-transitory computer-readable medium having code for:
receiving an over-the-air broadcast of an overload indication from a neighboring node;
detecting the overload indication received on a physical broadcast channel (PBCH) from the neighboring node, wherein the receiving comprises receiving two resource blocks within a center of six resource blocks in a midamble of a shortened PBCH; and
performing transmit power control based upon the received overload indication to reduce an interference level at the neighboring node.

22. The computer program product of claim 21, wherein the computer-readable medium further has code for adjusting transmit power spectral density.

23. The computer program product of claim 21, wherein the interference level comprises Interference over Thermal (IoT) noise.

24. A computer program product, comprising:
a non-transitory computer-readable medium having code for:
receiving an over-the-air broadcast of an overload indication from a neighboring node;
detecting the overload indication received on a physical hybrid automatic repeat request indicator channel (PHICH);
reserving PHICH resources per cell to convey the overload indication; and
performing transmit power control based upon the received overload indication to reduce an interference level at the neighboring node.

25. An apparatus for performing uplink transmit power control, comprising:
at least one processor configured to:
receive an over-the-air broadcast of an overload indication from a neighboring node;
detect the overload indication received on a physical broadcast channel (PBCH) from the neighboring node, wherein the receiving comprises receiving two resource blocks within a center of six resource blocks in a midamble of a shortened PBCH; and
perform transmit power control based upon the received overload indication to reduce an interference level at the neighboring node.

26. The apparatus of claim 25, wherein the at least one processor performs the transmit power control by adjusting transmit power spectral density.

27. The apparatus of claim 25, wherein the interference level comprises Interference over Thermal (IoT) noise.

28. An apparatus for performing uplink transmit power control, comprising:
at least one processor configured to:
receive an over-the-air broadcast of an overload indication from a neighboring node;
detect the overload indication received on a physical hybrid automatic repeat request indicator channel (PHICH);
reserve PHICH resources per cell to convey the overload indication; and
perform transmit power control based upon the received overload indication to reduce an interference level at the neighboring node.

29. An apparatus for performing uplink transmit power control, comprising:
means for receiving an over-the-air broadcast of an overload indication from a neighboring node;
means for detecting the overload indication received on a physical broadcast channel (PBCH) from the neighboring node, wherein the receiving comprises receiving two resource blocks within a center of six resource blocks in a midamble of a shortened PBCH; and
means for performing transmit power control based upon the received overload indication to reduce an interference level at the neighboring node.

30. The apparatus of claim 29, further comprising means for adjusting transmit power spectral density.

31. The apparatus of claim 29, wherein the interference level comprises Interference over Thermal (IoT) noise.

32. An apparatus for performing uplink transmit power control, comprising:
means for receiving an over-the-air broadcast of an overload indication from a neighboring node;
means for detecting the overload indication received on a physical hybrid automatic repeat request indicator channel (PHICH);
means for reserving PHICH resources per cell to convey the overload indication; and
means for performing transmit power control based upon the received overload indication to reduce an interference level at the neighboring node.

33. A method for broadcasting an overload indication, comprising:
determining that an interference level on an uplink exceeds a threshold; and
transmitting an over-the-air broadcast of the overload indication on a physical broadcast channel (PBCH) for a neighboring recipient to perform transmit power control based upon the overload indication, wherein the transmitting comprises transmitting two resource blocks within a center of six resource blocks in a midamble of a shortened PBCH.

34. The method of claim 33, wherein the interference level comprises Interference over Thermal (IoT) noise.

35. The method of claim 33, further comprising transmitting the overload indication as a bit carried by the PBCH.

36. A method for broadcasting an overload indication, comprising:
determining that an interference level on an uplink exceeds a threshold; and
transmitting an over-the-air broadcast of the overload indication on a physical hybrid automatic repeat request indicator channel (PHICH) for a neighboring recipient to perform transmit power control based upon the overload indication, wherein the transmitting comprises transmitting PHICH resources on the PHICH that are orthogonal across a plurality of neighboring nodes for achieving a defined signal-to-noise ratio penetration.

37. The method of claim 36, wherein the PHICH is frequency division multiplexed (FDM) modulated in a different frequency resource from a plurality of neighboring nodes.

38. The method of claim 36, wherein the PHICH is code division multiplexed (CDM) modulated in a different Walsh code from a plurality of neighboring nodes.

39. A method for broadcasting an overload indication, comprising:
  determining that an interference level on an uplink exceeds a threshold;
  transmitting an over-the-air broadcast of the overload indication on a physical hybrid automatic repeat request indicator channel (PHICH) for a neighboring recipient to perform transmit power control based upon the overload indication; and
  distributing the overload indication across a plurality of PHICH resources on the PHICH.

40. A method for broadcasting an overload indication, comprising:
  determining that an interference level on an uplink exceeds a threshold; and
  transmitting an over-the-air broadcast of the overload indication on a physical hybrid automatic repeat request indicator channel (PHICH) for a neighboring recipient to perform transmit power control based upon the overload indication, wherein the transmitting comprises transmitting the overload indication on a center portion of bandwidth used for receiving by a recipient.

41. A method for broadcasting an overload indication, comprising:
  determining that an interference level on an uplink exceeds a threshold; and
  transmitting an over-the-air broadcast of the overload indication on a physical hybrid automatic repeat request indicator channel (PHICH) for a neighboring recipient to perform transmit power control based upon the overload indication, wherein the transmitting comprises transmitting the overload indication as a Walsh code that is a function of a cell identifier.

42. The method of claim 36, wherein the PHICH is time division multiplexed (TDM) modulated in a different time slot from a plurality of neighboring nodes.

43. A computer program product for broadcasting an overload indication, comprising:
  a non-transitory computer-readable medium having code for:
    determining that an interference level on an uplink exceeds a threshold; and
    transmitting an over-the-air broadcast of the overload indication on a physical broadcast channel (PBCH) for a neighboring recipient to perform transmit power control based upon the overload indication, wherein the transmitting comprises transmitting two resource blocks within a center of six resource blocks in a midamble of a shortened PBCH.

44. The computer program product of claim 43, wherein the interference level comprises Interference over Thermal (IoT) noise.

45. A computer program product for broadcasting an overload indication, comprising:
  a non-transitory computer-readable medium having code for:
    determining that an interference level on an uplink exceeds a threshold; and
    transmitting an over-the-air broadcast of the overload indication on a physical hybrid automatic repeat request indicator channel (PHICH) for a neighboring recipient to perform transmit power control based upon the overload indication, wherein the transmitting comprises transmitting PHICH resources on the PHICH that are orthogonal across a plurality of neighboring nodes for achieving a defined signal-to-noise ratio penetration.

46. An apparatus for broadcasting an overload indication, comprising:
  at least one processor configured to:
    determine that an interference level on an uplink exceeds a threshold; and
    instruct a transmitter to transmit an over-the-air broadcast of the overload indication on a physical broadcast channel (PBCH) for a neighboring recipient to perform transmit power control based upon the overload indication, wherein the transmitting comprises transmitting two resource blocks within a center of six resource blocks in a midamble of a shortened PBCH.

47. The apparatus of claim 46, wherein the interference level comprises Interference over Thermal (IoT) noise.

48. An apparatus for broadcasting an overload indication, comprising:
  at least one processor configured to:
    determine that an interference level on an uplink exceeds a threshold; and
    instruct a transmitter to transmit an over-the-air broadcast of the overload indication on a physical hybrid automatic repeat request indicator channel (PHICH) for a neighboring recipient to perform transmit power control based upon the overload indication, wherein the transmitting comprises transmitting PHICH resources on the PHICH that are orthogonal across a plurality of neighboring nodes for achieving a defined signal-to-noise ratio penetration.

49. An apparatus for broadcasting an overload indication, comprising:
  means for determining that an interference level on an uplink exceeds a threshold; and
  means for transmitting an over-the-air broadcast of the overload indication on a physical broadcast channel (PBCH) for a neighboring recipient to perform transmit power control based upon the overload indication, wherein the transmitting comprises transmitting two resource blocks within a center of six resource blocks in a midamble of a shortened PBCH.

50. The apparatus of claim 49, wherein the interference level comprises Interference over Thermal (IoT) noise.

51. An apparatus for broadcasting an overload indication, comprising:
  means for determining that an interference level on an uplink exceeds a threshold; and
  means for transmitting an over-the-air broadcast of the overload indication on a physical hybrid automatic repeat request indicator channel (PHICH) for a neighboring recipient to perform transmit s ower control based u s on the overload indication wherein the transmitting comprises transmitting PHICH resources on the PHICH that are orthogonal across a plurality of neighboring nodes for achieving a defined signal-to-noise ratio penetration.

* * * * *